United States Patent Office 3,183,013
Patented May 11, 1965

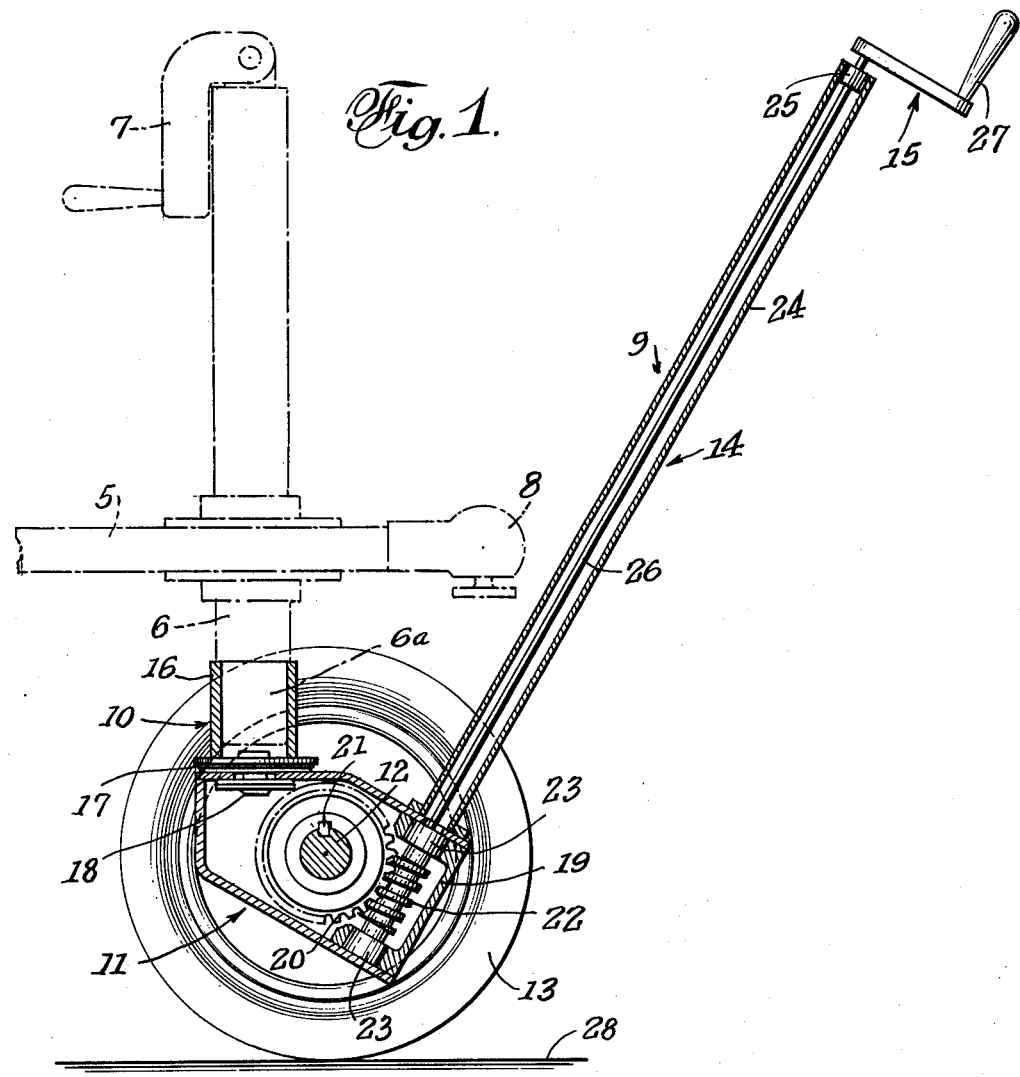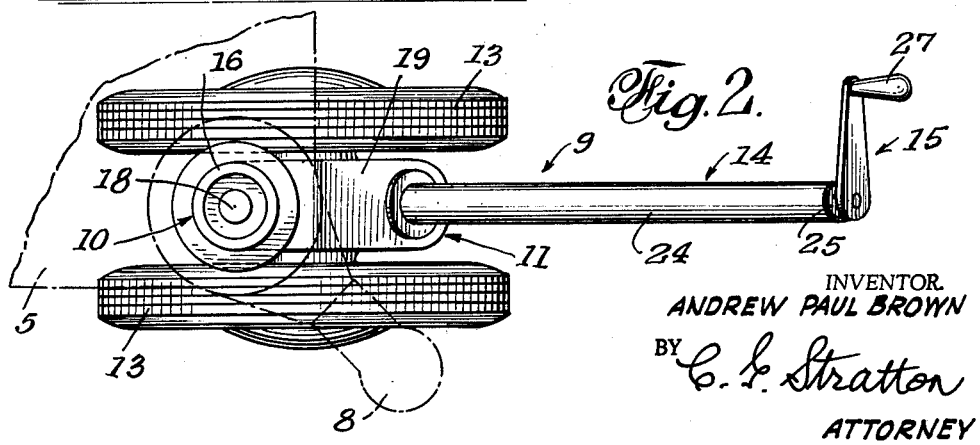

3,183,013
TRAILER SPOTTER
Andrew Paul Brown, 8637 Cypress Ave.,
South Gate, Calif.
Filed Sept. 9, 1963, Ser. No. 307,621
3 Claims. (Cl. 280—3)

This invention relates to a trailer spotter, i.e., a device to facilitate parking of travel trailers, boat trailers, and other such towed vehicles. This application is a continuation-in-part of my pending application filed September 4, 1962, Serial No. 221,383 and now abandoned.

An object of the invention is to provide a trailer spotter for separable connection to a trailer that, by manual manipulation thereof, enables spotting said trailer in close quarters to park the same after being detached from towing vehicle. The present spotter is effective for spotting trailers in spaces or places difficult if not impossible to reach by maneuvering of a towing vehicle.

Another object of the invention is to provide a trailer spotter that provides a power advantage enabling manual operation and, furthermore, is self-locking in the interests of safety.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawing. However, said drawing merely show, and the following description merely describes, one embodiment of the present invention, which is given by way of illustration or example only.

In the drawing, like reference characters designate similar parts in the several views.

FIG. 1 is a vertical sectional view of the present trailer spotter showing the same connected to the tongue of a trailer.

FIG. 2 is a top plan view thereof.

The drawing shows the tongue 5 of a two-wheel trailer provided, in any of the usual ways, with a swivel caster shaft 6 that may be extended or retracted by crank means 7, and with a hitch 8 for connection to a towing vehicle. It will be understood that the hitch 8 connects to a towing vehicle for transporting the trailer from place to place, and that the shaft 6 and its crank means 7 raises and lowers the tongue 5 of the trailer so a support caster wheel may be applied to the shaft 6 to retain the trailer in level condition after the towing vehicle has been detached from the hitch 8. The present spotter 9 is removably connected to said shaft 6 to carry out the trailer spotting operation and then replaced by the usual caster wheel, as above mentioned.

The spotter 9 comprises, generally, a swivel socket 10 for separable connection to the lower end of the shaft 6, a power-advantage unit 11 swivelly connected to said socket 10, a transverse output shaft 12 extending from opposite sides of the unit 11, traction wheels 13 affixed to the ends of the shaft 12, an elongated extension 14 on the unit 11 directed angularly upward from said unit, and crank means 15 to manually operate the unit 11 to rotate the wheels 13 in either direction, as desired.

The swivel socket 10 is shown as a cup-like member 16 in which the end 6a of the shaft 6 is received, and a bearing assembly 17 on the lower end of said member embodying a vertical pivot 18.

The unit 11 is connected to the socket 10 by the bearing assembly 17 and is rotational around the axis of the pivot 18. Said unit is shown as a housing 19 that extends in one direction from the pivot 18, the mentioned transverse shaft 12 extending transversely through said housing. Suitable bearings on either side of the housing journal said shaft on which a worm wheel 20 is fixedly provided as by means of a key 21. Transverse to the shaft 12 and on the side of the wheel 20 away from the pivot 18, a worm 22 is provided, the same, at its ends, being journalled in anti-friction bearings 23. The mentioned bearings for the shaft 12 may be similar to but larger than said bearings 23.

The wheels 13 are preferably provided with pneumatic tires and are arranged on opposite sides of the unit 11. The same are affixed to ends of shaft 12 extending from the housing 19. As is clearly shown in FIG. 1, the axis of the worm 22 is directed at an upward angle in diverging relationship to the axis of the swivel pivot 18.

The elongated extension 14 is shown as a tube 24 that extends along and upward of the worm and is affixed to the housing 19, and an anti-friction bearing 25 in the upper end of said tube.

The crank means 15 is shown as a shaft 26 that extends from the worm 22 through the tube 24 and is journalled in the bearing 25. The shaft 26 is extended beyond said bearing and is provided with a crank 27.

Operation

To apply the present spotter 9, the crank 7 is used to upwardly retract the shaft 6 while the trailer, represented by the tongue 5, is still connected by the hitch 8 to the towing vehicle. The spotter is then run into position so the shaft end 6a will enter the socket 10 as the shaft 6 is lowered. When the shaft 6 can no longer project in a downward direction because of the engagement of the wheels with the ground or pavement 28, the tongue 5 will swing upwardly on the axis of the support wheels of the trailer, thereby enabling disconnection of the towing vehicle from the trailer at the hitch 8. The crank 7 may now be used to level off the trailer 5 which is now supported on its own wheels and on the wheels 13. Since the worm wheel 20 and worm 22 are self-locking, i.e., they remain locked against rotation except when the worm 22 is rotated by the crank 27. The spotter will act as a fixed support for the hitch end of trailer and may be so used, if desired, as a substitute for the conventional caster wheel previously mentioned.

It will be evident that the wheels 13 are turned slowly by rotation of the crank 27 and will track to push or pull the trailer when the same are aligned with the longitudinal center of the trailer, or will track in either direction along arcuate paths to turn the trailer around the center of its support axle, or will track along paths that combine the push-pull paths and said arcuate paths. Thus, the present spotter comprises a device by which a trailer may be turned up to 360° around the center of its support axle, moved straight back or forth, and maneuvered along composite straight and curved paths that ease the operation of parking the trailer in close quarters.

The power advantage afforded by the present gearing— one hundred to one being exemplary—enables effortless rotation of the crank 27 and ready maneuverability of the trailer.

While two wheels 13 are shown, only one may be used in which case the wheel is preferably aligned with the longitudinal center of the trailer with the unit 11 offset accordingly.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. A trailer spotter for connection to the tongue of a two-wheel trailer comprising:
   (a) geared unit having a worm and worm wheel drive with a transverse output shaft affixed to the worm wheel,
   (b) swivel means for connecting said unit to the trailer tongue and swivelly rotational around a vertical axis,
   (c) wheel means affixed to and rotational upon rotation of the output shaft,
   (d) an elongated tubular extension on said unit,
   (e) a shaft affixed to the worm and extending longitudinally in said tubular extension, and
   (f) a hand crank on the upper end of the latter shaft for rotating the worm to drive the worm wheel and the wheel means affixed therewith.

2. A trailer spotter for connection to the tongue of a two-wheel trailer comprising:
   (a) a geared unit having a worm and worm wheel drive with a transverse output shaft affixed to the worm wheel,
   (b) swivel means for connecting said unit to the trailer tongue and swivelly rotational around a vertical axis,
   (c) the output shaft having extensions on both sides of the geared unit,
   (d) a pair of traction wheels affixed to the shaft extensions,
   (e) an elongated tubular extension on said unit,
   (f) a shaft affixed to the worm and extending longitudinally in said tubular extension, and
   (g) a hand crank on the upper end of the latter shaft for rotating the worm to drive the worm wheel and the wheel means affixed therewith.

3. A trailer spotter for connection to the tongue of a two-wheel trailer and provided with a caster shaft, said spotter comprising:
   (a) a socket member adapted to receive the end of the caster shaft,
   (b) a gear housing,
   (c) a swivel connection between the socket member and the gear housing,
   (d) a self-locking gear set comprising a worm wheel and a worm housed in the gear housing,
   (e) axle extensions on the worm wheel,
   (f) a pair of support and traction wheels affixed to and rotational with the axle extensions, one wheel on each side of the gear housing,
   (g) an upwardly directed tubular extension on the gear housing,
   (h) a shaft affixed with the worm and extending axially in the extension, and
   (i) a crank on the end of said shaft.

References Cited by the Examiner
UNITED STATES PATENTS

| | | | |
|---|---|---|---|
| 712,520 | 11/02 | Gragert | 280—3 |
| 1,373,352 | 3/21 | Rice | 280—3 |
| 1,543,958 | 6/25 | Sutherland | 280—151 |
| 2,534,575 | 12/50 | Conley et al. | 280—405 |
| 2,786,690 | 3/57 | Tharp | 280—3 |
| 3,156,315 | 11/64 | Hawgood | 280—3 X |

FOREIGN PATENTS

| | | |
|---|---|---|
| 127,014 | 12/49 | Sweden. |
| 475,746 | 11/37 | Great Britain. |
| 1,296,605 | 5/62 | France. |

A. HARRY LEVY, *Primary Examiner.*

LEO FRIAGLIA, *Examiner.*